(12) United States Patent
Casella

(10) Patent No.: US 11,384,685 B1
(45) Date of Patent: Jul. 12, 2022

(54) CASELLA HYDRAULIC VARIABLE COMPRESSION RATIO PISTON

(71) Applicant: Paulo E. Casella, Malden, MA (US)

(72) Inventor: Paulo E. Casella, Malden, MA (US)

(73) Assignee: Paulo E. Casella, Malden, MA (US)

( * ) Notice: Subject to any disclaimer, the term of this patent is extended or adjusted under 35 U.S.C. 154(b) by 0 days.

(21) Appl. No.: 16/974,400

(22) Filed: Jan. 14, 2021

(51) Int. Cl.
    *F02B 75/04* (2006.01)
    *F16J 1/08* (2006.01)
    *F16J 1/18* (2006.01)

(52) U.S. Cl.
    CPC ............... *F02B 75/044* (2013.01); *F16J 1/08* (2013.01); *F16J 1/18* (2013.01)

(58) Field of Classification Search
    CPC ................ F02B 75/044; F16J 1/08; F16J 1/18
    See application file for complete search history.

(56) References Cited

FOREIGN PATENT DOCUMENTS

CN      205503273 U   *   8/2016

* cited by examiner

*Primary Examiner* — Jacob M Amick
*Assistant Examiner* — Charles J Brauch

(57) ABSTRACT

The invention in question relates, in particular, to a hydraulic variable compression ratio piston comprising a full floating eccentric mounted in the body of said piston, wherein the eccentric accepts a piston pin, with the pin in turn, accepting the small end of the connecting rod. The eccentric moves in a circular manner against the force of preloaded springs installed at the bottom of the piston, thereby allowing the piston to move up or down relative to the connecting rod. An adjustment mechanism within the piston comprising of a combination of said preloaded springs and a lifter acting against the movement of the eccentric, holds the piston's current position relative to the connecting rod until an increase or decrease in combustion forces act upon the piston and changes the compression ratio.

7 Claims, 6 Drawing Sheets

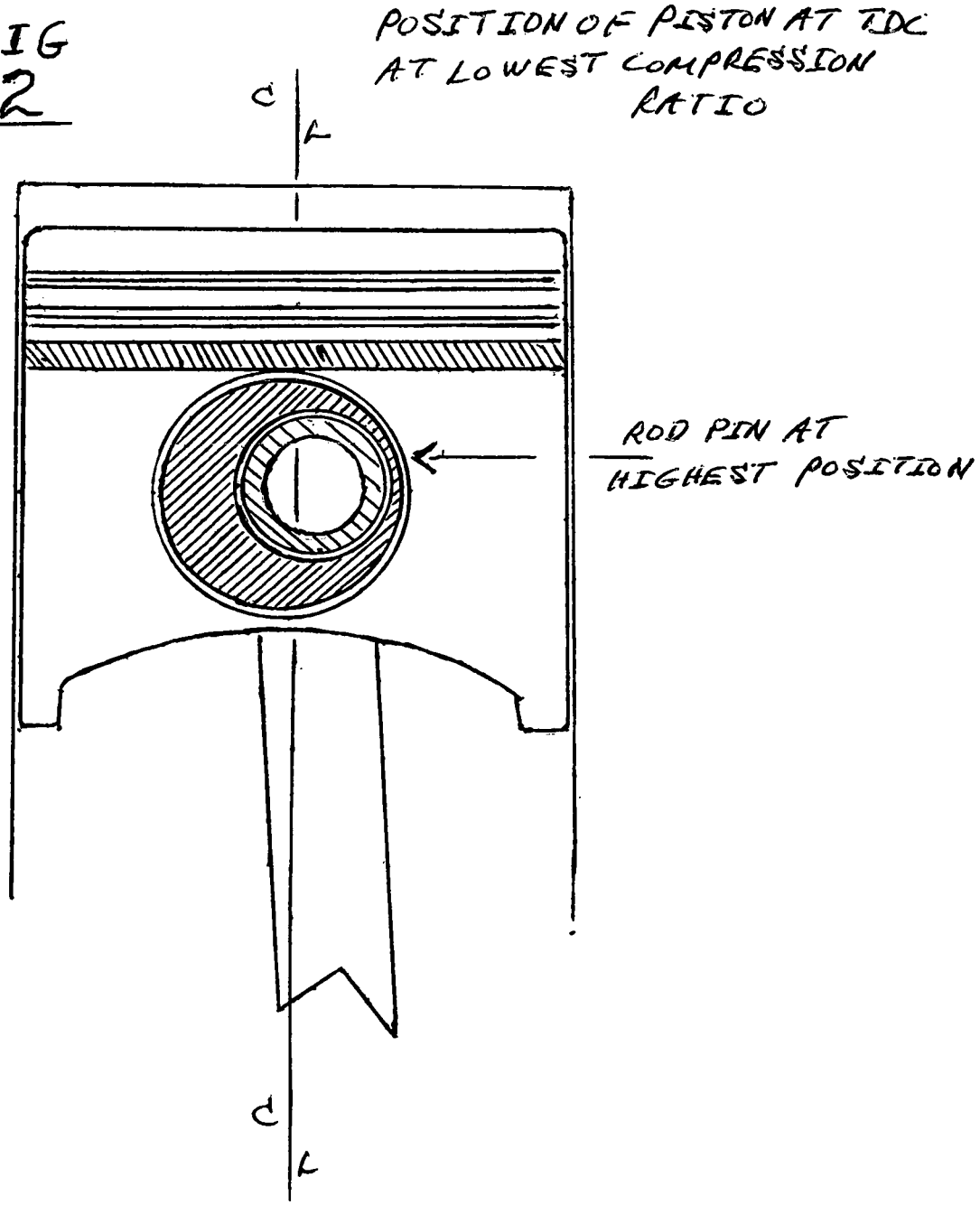

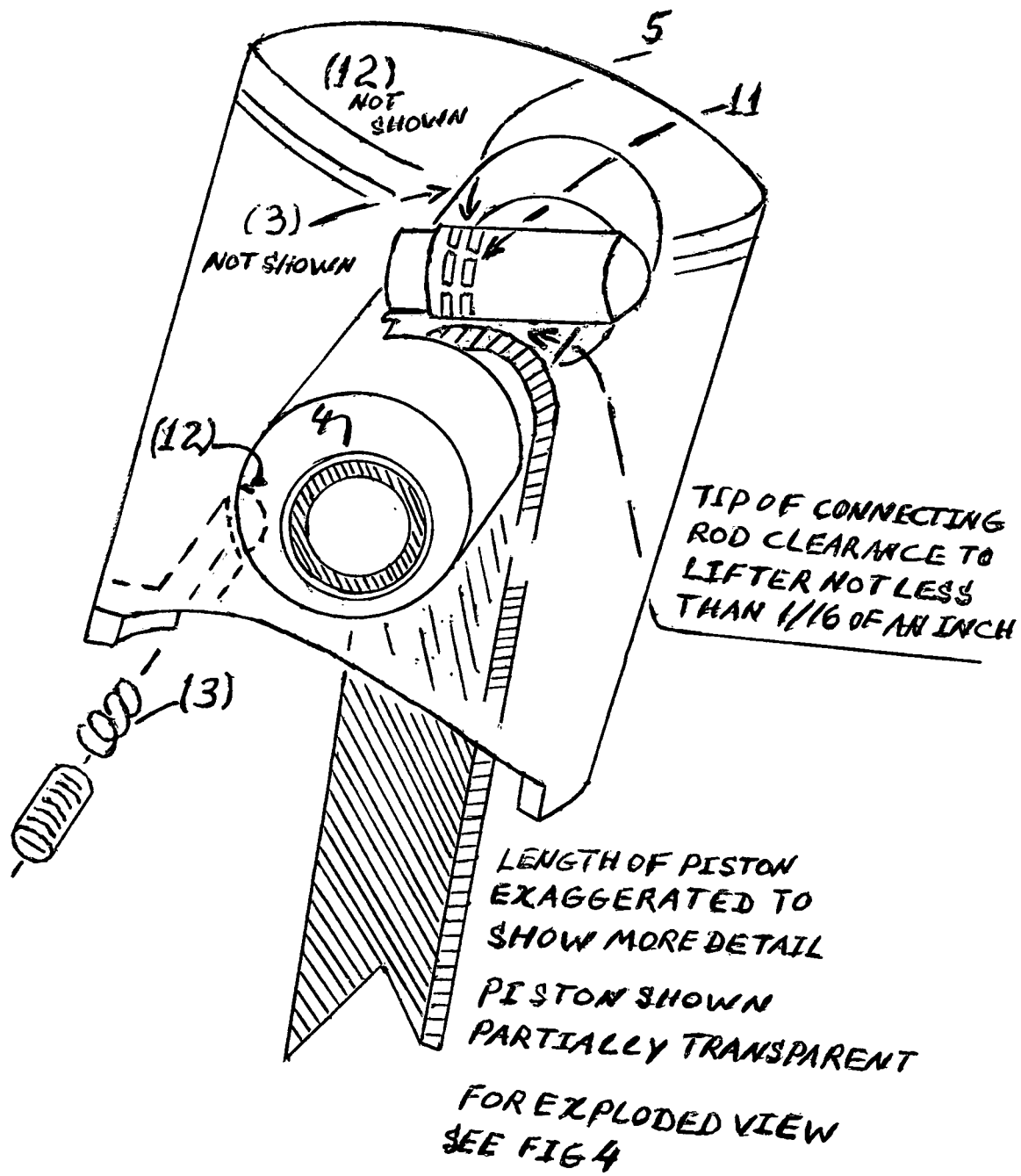

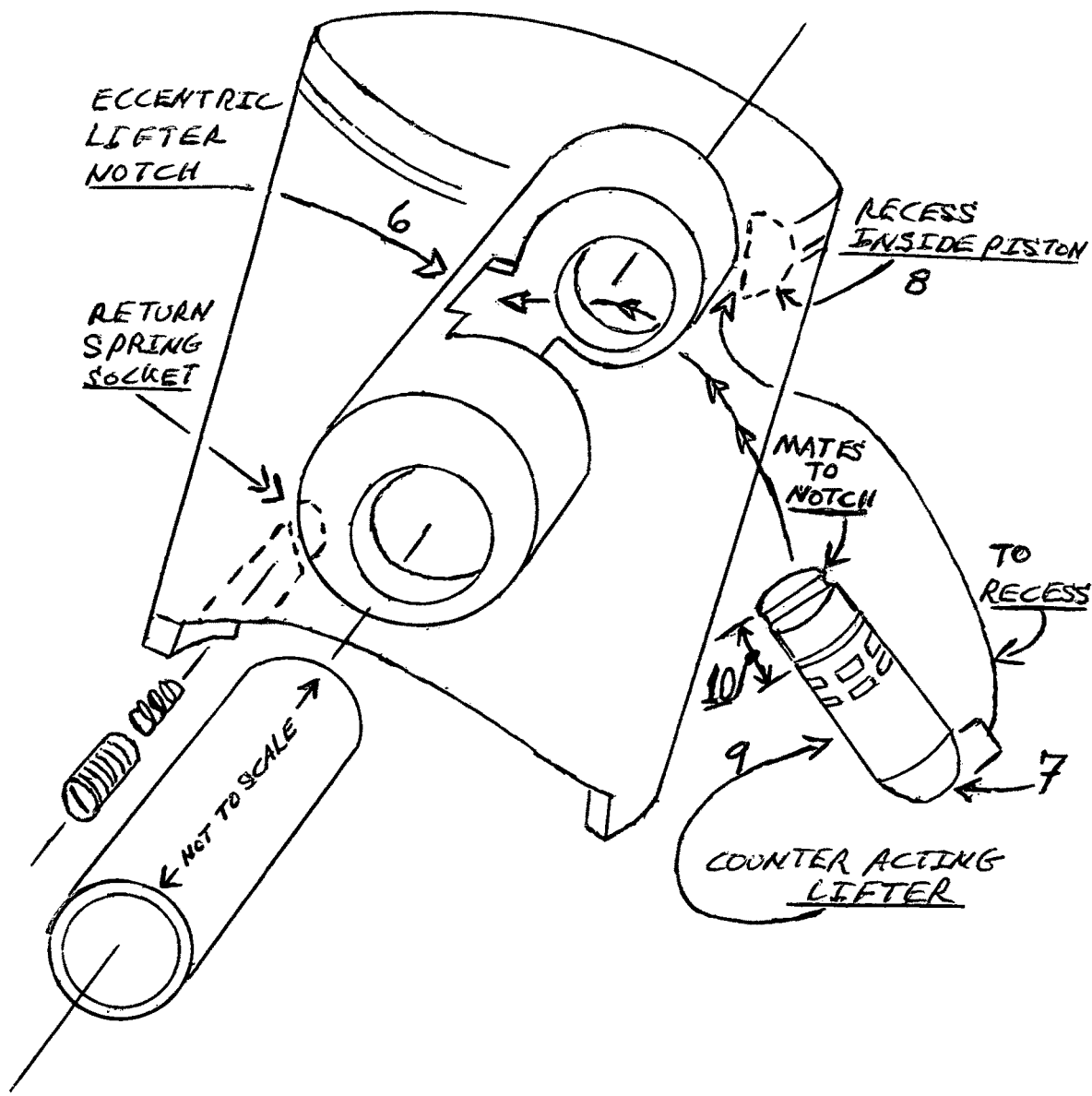

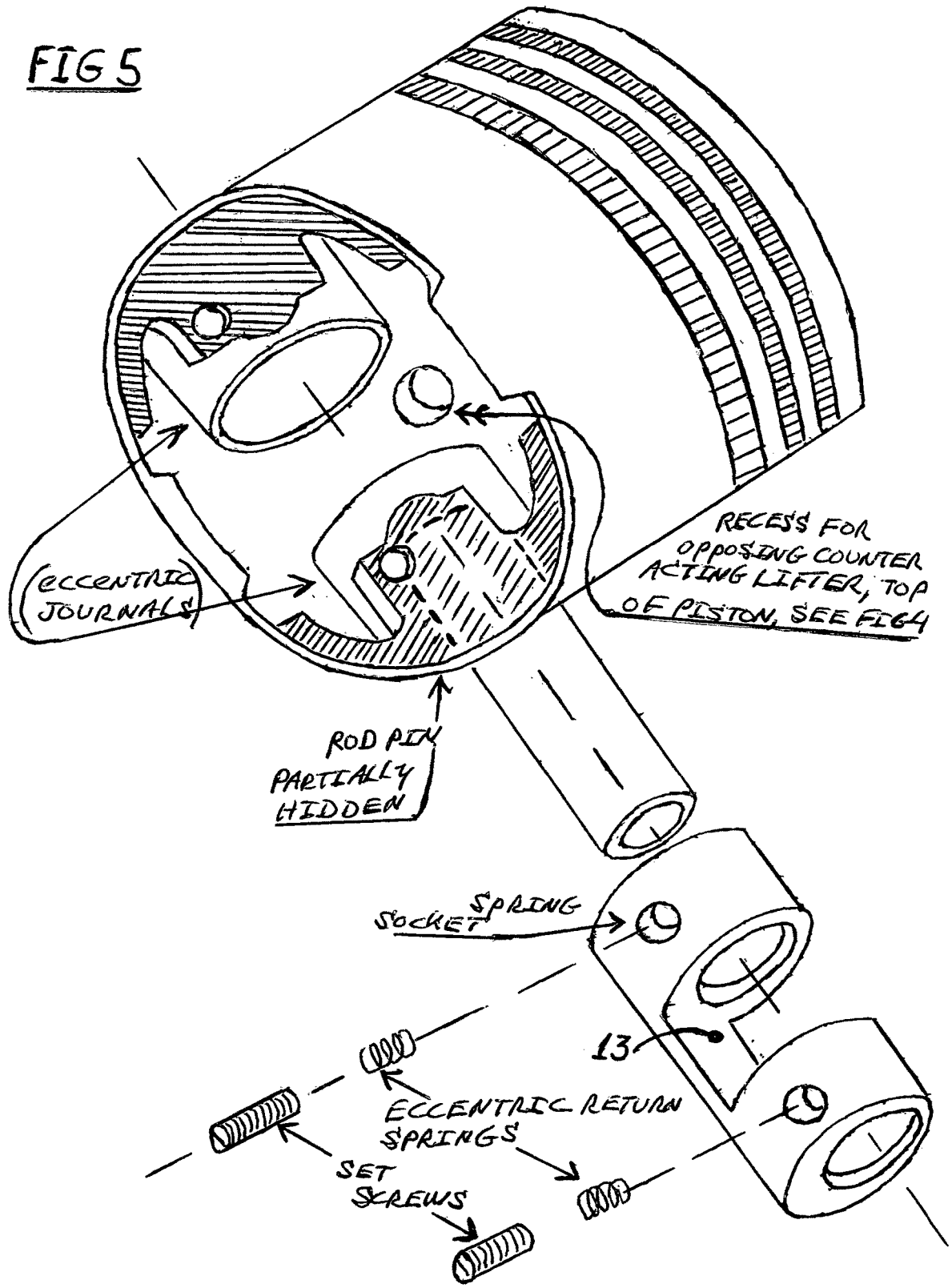

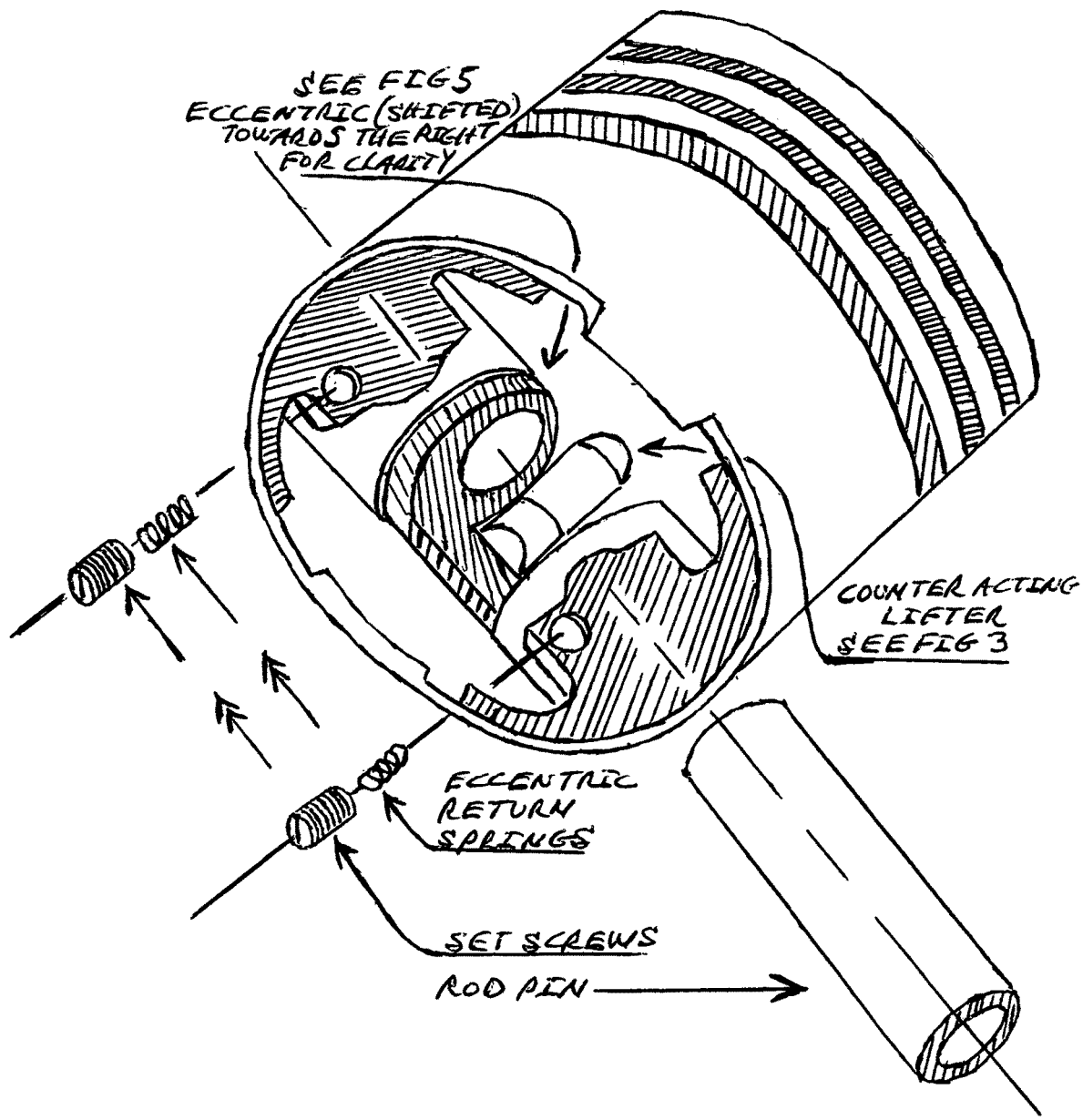

CASELLA HYDRAULIC VARIABLE COMPRESSION RATIO PISTON

BACKGROUND OF THE INVENTION (1) Field of the Invention

The present invention relates to a variable compression ratio piston which changes height relative to a common connecting rod to modify the compression ratio in a typical internal combustion engine.

(2) Description of the Related Art

In modern internal combustion engines, a higher compression ratio yields more power and greater fuel efficiency. Compression ratio is thus defined as the largest cylindrical volume atop the piston, at bottom dead enter, divided by the smallest cylindrical volume atop the same piston at top dead center. By definition, a fixed compression ratio only allows combustion efficiency to occur at maximum engine torque and load with only partial combustion at lesser loads due to the partial filling of the cylinder. Partial filling occurs when only small injection of fuel and air are required for smaller engine loads or when the total mix of fuel and air does not completely fill the cylinder due to air friction and greater piston speeds.

A variable compression engine, however, constantly changes the compression ratio to match the combination of air/fuel mix and engine load, thereby achieving full and efficient combustion at every engine speed. Variable compression does make for an overly complex and expensive engine design.

The hydraulic variable compression ratio piston, however, is a more reliable, simpler, and cheaper build, and still allows the flexibility of a variable compression engine.

BRIEF SUMMARY OF THE INVENTION

This invention changes compression by doing a partial movement of the piston relative to the connecting rod. As the combustion wave front pushes against the piston, the piston shrinks down relative to the connecting rod, much like a shock absorber, to avoid harmful pre-detonation in the case of excessive combustion pressure at the current compression ratio, for example, 12 to 1. This partial movement is achieved by the rotation of the eccentric piston pin.

The relative position of the piston stays fixed at its current compression ratio. The compression ratio only changes when power levels and inertia of the piston and connecting rod at bottom dead center increases or decreases.

This control of the compression ratio is achieved with a combination of return springs to the eccentric and an opposing contra-acting lifter to the eccentric. The function of the return springs, to return the eccentric to its original position, is opposed and controlled by the opposing lifter, installed within the piston.

The lifter eventually loses oil and contracts, but very slowly at lower combustion and engine loads. At higher combustion and greater engine loads, the lifter expands as the return springs contract. The eccentric therefore only turns when there are changes in the combustion pressure. If power levels remain the same, the opposing lifter holds its position against the eccentric return springs, and the compression ratio stays the same.

BRIEF DESCRIPTION OF DRAWINGS

FIG. 2 depicts the variable compression piston at its lowest, at bottom dead center, with the eccentric piston pin at its highest position in the eccentric. In this depiction the compression ratio is at its lowest, for example 8 to 1.

FIG. 3 shows the piston partially transparent to convey all parts within the piston, including the counter-acting opposing lifter. One end of the lifter fits into a notch in the eccentric. The other end of the lifter, rounded end, fits into a recess at a top corner machined inside the piston, recess not shown in FIG. 3. The connecting rod is shaded for clarity. The connecting rod's top small end clears the head of the lifter by not less than ¹⁄₁₆ of an inch. The lifter's oil intake channels are just above the connecting rod. Only one eccentric return spring along with its set screw is shown (for clarity) at the bottom of the piston. The second spring and screw are located on the other side of the piston. These springs reside inside housings machined or cast into the bottom skirt reinforcement of the piston.

FIG. 4 again shows the return springs. The springs are housed in cylindrical pockets, machined or cast, at the skirt reinforcement at the bottom side of the piston. The springs then fit into machined indentations on either side of the eccentric, with the other return spring and its corresponding set screw at the opposite side of eccentric, these not shown for purposes of clarity. A notch is cut-out in the middle of the eccentric and accepts one end of the opposing lifter. This end of the lifter is a retractable piston which moves in and out and pushes against the eccentric.

Figure 1:
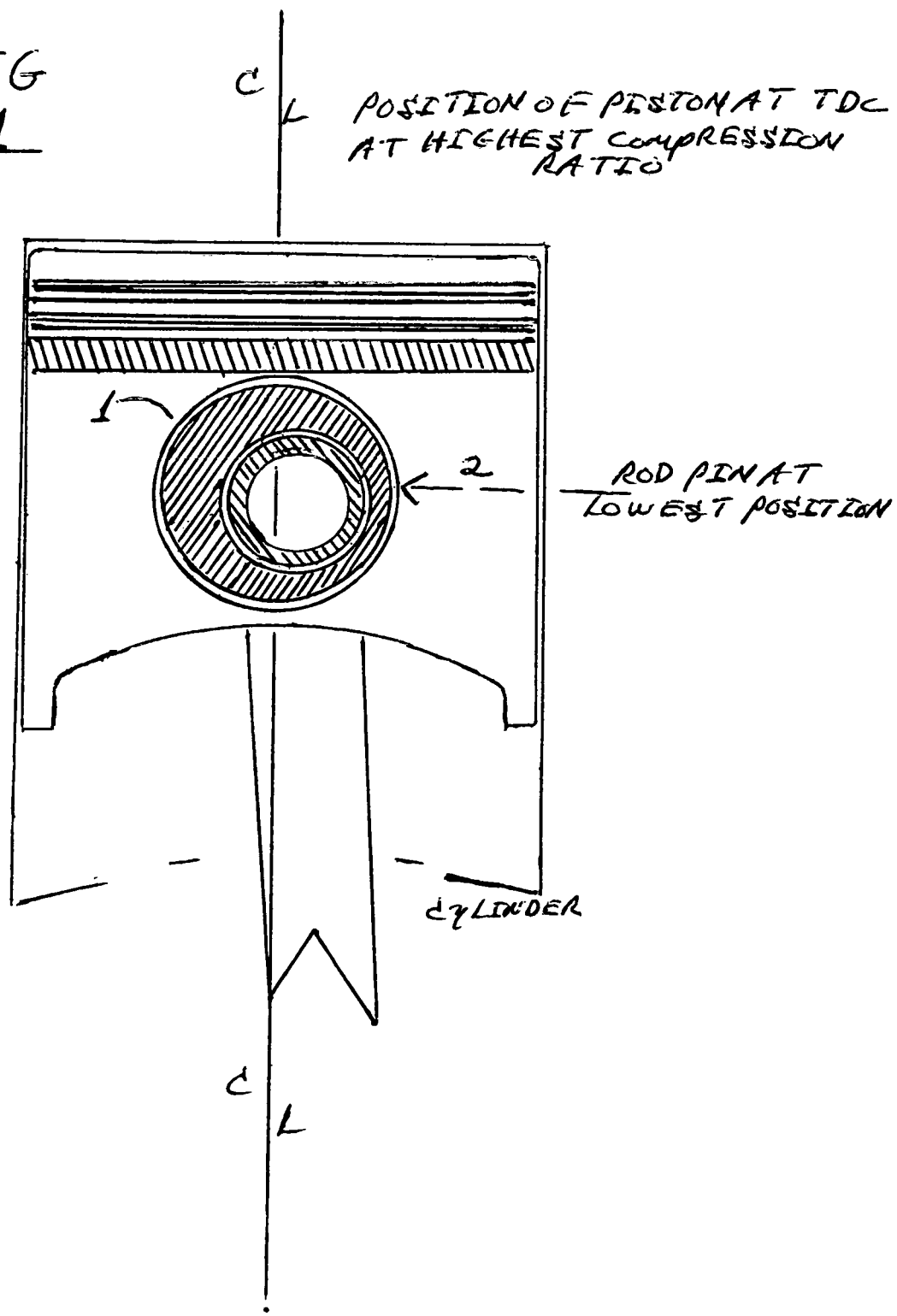
FIG. 1 depicts the variable compression piston at its highest, at top dead center, with the eccentric piston pin at its lowest position in the eccentric. In this depiction the compression ratio is at its highest, for example 12 to 1.

A rounded end of the lifter goes into its mating recess within the inside corner of the piston which is shown as dashes.

FIG. 5 displays the exploded view of the piston bottom. The eccentric journals on either side of the piston house the eccentric. The eccentric houses the piston pin. Both the eccentric and piston pin are free floating and are retained by one set of lock rings, not shown. The shaded areas at the piston skirt bottom reinforcement are machined to accept the two return springs, and a pair of set screws or press fitted pins push against and retain the return springs.

The springs push against the two indentations machined on either side of the eccentric. The eccentric is drawn outside the piston. Inside the piston, a recess is drawn, not to scale, where the rounded end of the opposing lifter fits at the top corner of the inside the piston.

FIG. 6 is another bottom view of the variable compression piston. Shaded areas are machined to accept the return springs. The eccentric is shaded and rides inside the journals. Connecting rod and lifter are not shown for clarity.

DETAILED DESCRIPTION OF THE INVENTION

The piston achieves variable compression by changing its vertical position relative to the connecting rod. A free moving eccentric (1). FIG. 1, is fitted into the body of the piston. The connecting rod pin (2) FIG. 1, in turn fits into the eccentric. A middle clearance cut-out (13) FIG. 5, is cut into the eccentric for connecting rod clearance. Another smaller cut-out (6) FIG. 4 is cut into the eccentric middle clearance (13) FIG. 5 to accept the opposing lifter piston (10) FIG. 4. The default/initial compression ratio of the cylinder is at its highest, for example 12:1.

With increases in engine power, the combustion forces atop the piston can reach upwards to 300 lbs, for example, but inertial forces acting on the piston/connecting rod assembly at top dead center (TDC), and bottom dead center (BDC) are magnitudes higher, up to 3000 lbs at highest engine power and rpm. The variable compression ratio piston does not rely on the combustion forces. The piston, rather, relies on the inertial forces at bottom dead center. At maximum power and highest inertial forces at BDC, the variable compression ratio piston fully deflects downwards, relative to the connecting rod, to the lowest compression setting. The lowest compression setting, however, is reached in stages (in 10 revolutions of the piston/rod assembly for example), as full power and highest engine rpm is not immediate with any engine, as seen with typical engines from a lesser rpm to wide open throttle (WOT).

As the engine reaches ever higher rpm and greater combustion pressures, each successive increase in inertia at BDC acts against the connecting rod and eccentric connecting pin (4) FIG. 3, and such increases in inertia results in turning the eccentric in the piston and decreasing the compression ratio accordingly.

The eccentric in turn acts against two opposing return springs (3) FIG. 3, fitted within the piston. Both springs fit into sockets (12) FIG. 3 machined into the eccentric, where the springs push against the eccentric. The movement of the eccentric and connecting pin within the eccentric, in essence an eccentric connecting pin (4) FIG. 3, allows partial movement of the piston downwards, relative to the connecting rod. With highest combustion forces on the piston, the compression ratio goes down to its lowest setting, for example 8:1. Otherwise, compression is higher, and the compression ratio changes continuously.

The piston's relative position at current compression ratio is held firmly in place by an opposing counter acting lifter (5) FIG. 3, with one end of it, the lifter retractable piston (10) FIG. 4, fitting into a notch (6) FIG. 4 cut into the middle edge (13) FIG. 5 of the eccentric, and the other, rounded end (7) FIG. 4 of said lifter, fitting into a recess (8) FIG. 4 within the piston. This opposing counter acting lifter (9) FIG. 4 expands out (10) FIG. 4 when the eccentric turns for lower compression, and the return springs of the eccentric contract, allowing the lifter to take in oil (11) FIG. 3.

The engine lubrification process delivers oil up into the piston skirt at each down stroke of the piston, thereby allowing the opposing lifter to take in oil, through the opposing lifter's oil intake channels (11) FIG. 3 A one-way check valve retains the oil in the lifter making the lifter and the piston compression ratio fixed at current engine horsepower.

A decrease in engine power and less downward inertial force on the piston/connecting rod assembly at bottom dead center allows the eccentric return springs to overpower the opposing counter acting lifter, and make the opposing counter acting lifter contract. In this embodiment of the invention, the opposing counter acting lifter contracts completely from a quick transition of wide-open throttle to idle, within 5 to 10 seconds. The return springs turn the eccentric, allowing the eccentric connecting pin to move downwards, the piston upwards, relative to the connecting rod, and increasing the compression ratio. This process of changing the compression ratio, up or down, occurs continuously.

What is claimed is:

1. A variable compression ratio piston for an internal combustion engines, the variable compression ratio piston comprising:
   a connecting rod;
   a full floating eccentric, the full floating eccentric having a middle clearance cut-out for connecting rod clearance;
   wherein preloaded return springs are abutted against circular indentations machined or cast into the full floating eccentric, allowing the full floating eccentric to move in a circular manner;
   wherein a square notch is cut into the edge of the middle clearance cut-out of the full floating eccentric;
   wherein a spring-loaded hydraulic lifter is received by the square notch.

2. The variable compression ratio piston of claim 1, wherein the spring-loaded hydraulic lifter is built with a retractable piston having freedom of travel between 5 and 10 millimeters,
   wherein the retractable piston extends and locks into position for between one and two seconds,
   wherein the retractable piston includes a groove extending across a face of the retractable piston,
   wherein the groove is received by the square notch located in the edge of the middle clearance cut-out of the full floating eccentric,
   wherein the square notch allows for movement and an anchoring point of the spring-loaded hydraulic lifter.

3. The variable compression ratio piston of claim 2,
   wherein the other end of the spring-loaded hydraulic lifter is rounded and fits into a matching rounded socket machined into the inside of the variable compression ratio piston,
   wherein this machined rounded socket allows movement of the spring-loaded hydraulic lifter and provides a second anchoring point for the spring-loaded hydraulic lifter.

4. The variable compression ratio piston of claim 3:
   wherein the spring loaded hydraulic lifter fits between the square notch in the full floating eccentric as a first anchoring point and the rounded socket machined into the variable compression ratio piston as the second anchoring point, wherein the spring loaded hydraulic lifter moves between the first anchoring point and the second anchoring point thereby controlling the movement of the full floating eccentric.

5. The variable compression ratio piston of claim 4:
   wherein the spring loaded hydraulic lifter includes oil intake channels configured to pull oil from bottom lubrication of the variable compression ratio piston when the spring loaded hydraulic lifter expands out, locks in position, and holds the full floating eccentric in position at current compression ratio by means of a built-in check valve.

6. The variable compression ratio piston of claim 1 further includes:
   a full floating piston pin which rides in the full floating eccentric and accepts the small end of the connecting rod;
   a single pair of circlips or clip retainers holding both the full floating eccentric and the full floating piston pin within the variable compression ratio piston.

7. The variable compression ratio piston of claim 6 further includes:
   one or more machined or cast socket holes positioned within a piston skirt bottom reinforcement;
   whereby the socket holes extend through the piston skirt bottom reinforcement and end at the surface of the full floating eccentric;
   wherein one or more return springs including a set of screws or press fitted pins are installed in the socket holes, whereby the screws or pins press against the return springs which press against the circular indentations on the full floating eccentric thereby allowing the full floating eccentric to rotate.

* * * * *